Oct. 27, 1936.   M. E. LAKE   2,059,121

PRESSURE REGULATING SYSTEM

Filed March 13, 1933

Inventor
M. E. Lake

By H. S. McDowell
Attorney

Patented Oct. 27, 1936

2,059,121

UNITED STATES PATENT OFFICE 2,059,121

PRESSURE REGULATING SYSTEM

Milton E. Lake, Columbus, Ohio

Application March 13, 1933, Serial No. 660,451

4 Claims. (Cl. 50—16)

This invention relates to improvements in pressure regulating or pressure reducing valves of the type employed in controlling the flow of gaseous fluids under pressures above atmospheric through pipe lines or other passages.

Regulators of this type are quite generally used, among other widely varying uses, in the gas industry for the purpose of reducing pressure in distributing lines from main transmission lines. Relatively high pressures are maintained on the gas as it is being forced through main lines to distributing centers and in the distributing or secondary lines, it is usually necessary that a materially lower pressure should obtain as compared with said main lines.

To accomplish this reduction in pressure automatically, the usual regulator comprises a valve body formed with inlet and outlet passages which communicate with the high pressure and low pressure lines respectively, the body being provided with a movable valve member by which gas flow between the inlet and outlet passages is governed. To control the opening and closing of the valve member, the latter has been usually provided with a stem having its upper end terminated in an enlarged head arranged in contact with a flexible diaphragm mounted in a diaphragm chamber provided in connection with the valve body. The stem is maintained in such contact with the diaphragm through the provision of an adjustable weight which normally functions to maintain the valve member in an open position. To overcome this tendency of the adjustable or variable weight, the outlet side of the regulator has been provided with a pipe line leading to the diaphragm chamber in order that the outlet pressures of the regulator may be applied to the diaphragm in such a manner as to counteract the valve opening tendency of the weighted valve stem, so that when the pressure in the outlet side of the regulator exceeds a predetermined value, determined by the variable weight, the said diaphragm will be actuated to overcome the force of the weight whereby to move the valve member to a position of closure, obstructing further gas flow for a limited period of time through the regulator. Then, when the gas pressure in the outlet side recedes, the action of the weight then serves to lift the valve member to a substantially open position, providing for resumed gas flow through the regulator.

In such standard regulators of the character generally described above, especially regulators handling gas at high pressures, considerable difficulty has been encountered in establishing uniform pressures in the low pressure lines, and such lack of uniformity also exists in pressure regulators employed for handling gases at lower pressures, for example, fifty pounds per square inch or less. In the standard high pressure regulator, diaphragms of relatively small diameter are employed and, due to the method of flexing these diaphragms, i. e., a constant mechanical pressure on one side of the diaphragm, and a variable gaseous pressure on the other side thereof, the operation of such a diaphragm and its associated valve member is highly irregular, jerky and devoid of smoothness, so that the pressures in the outlet lines vary through relatively wide limits and occasion considerable uncertainty. Moreover, due to the irregularity of their functioning, a high degree of wear imparting stress is applied to the diaphragm, causing severe flexing thereof with relatively short life and a constantly varying effective area against which gaseous pressures are exerted when the diaphragm is moved from its mean position in the diaphragm chamber.

It is, therefore, one of the outstanding objects of the present invention to provide an improved regulator wherein the diaphragm is mounted and clamped in its supporting casing in such a manner as to divide the latter into a constant gas pressure chamber and a variable gas pressure chamber, the constant chamber communicating with the gas inlet line so that the normal tendency of the gas pressure in the constant chamber is to flex the diaphragm to admit of the opening of the associated valve member to provide for gas passage through the regulator and wherein supplemental means, including a sensitive by-pass regulator, are provided for establishing variable gas pressures in the variable chamber, whereby when the gas pressures on opposite sides of said diaphragm are substantially balanced, the valve member of the main regulator is closed by the action of a regulating spring or weight and when the pressures are unbalanced in the diaphragm chambers, the valve member is opened and the forces applied by the spring or weight overcome. Through the provision of the sensitive secondary regulator, which is connected with the outlet side of the main regulator, slight variations in pressure of the gases passing through the said outlet side will be effective to open or arrest gas flow through the by-pass line extending from the inlet to the outlet side of the main regulator, in order that the velocity of the flow of gas through said by-pass line may be used in unbalancing the fluid pressures applied to the diaphragm of the valve member in the main regulator, and upon the arresting of gas flow through the by-pass line to admit of the restoration of equalizing or balanced gas pressures on said diaphragm.

It is therefore another object of the invention to provide pressure regulating mechanism of the character set forth wherein the pressure to be established in the outlet or distributing line may be maintained within extremely close limits, and to avoid the wide fluctuations inherent in the operation of ordinary regulators of this type.

It is a further object of the invention to provide automatic regulators which may be employed for governing pressures varying from a few ounces above atmospheric to several hundreds of pounds eliminating the use, as heretofore, of specially designed regulators for different pressure classes.

It is another object of the invention to avoid the use of stuffing boxes or glands in valves or regulators of this character in order to reduce gas losses, to avoid inspection, adjustment and repairs incident to the maintenance of an efficient packing for a movable valve stem in a stationary casing, and also to reduce irregularities in operation established by the element of friction when stuffing boxes are employed.

For a further understanding of the invention, reference is to be had to the following description and the accompanying drawing, wherein.

Figure 1:
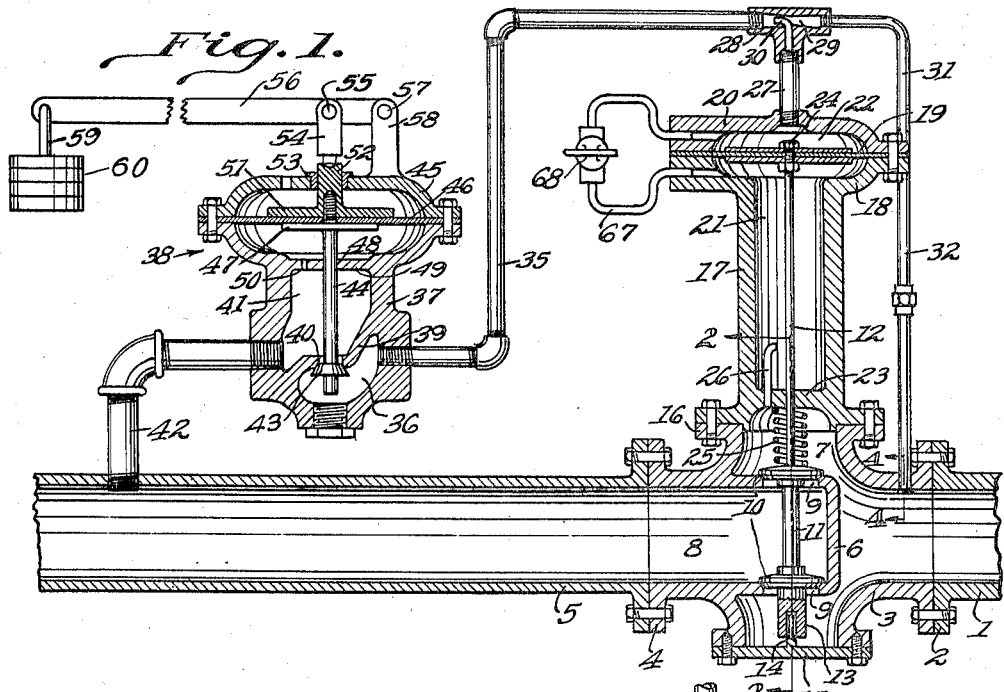
Fig. 1 is a vertical sectional view taken through the improved pressure regulating mechanism comprising the present invention.

Referring more particularly to the drawing, the numeral 1 designates a pipe line or other conduit or passage through which a gaseous fluid under any suitable pressure above atmospheric is passed. This pipe line is connected by the flanged coupling 2 with the body 3 of a main regulator. In alignment with the pipe line 1, the opposite side of the valve body is provided with a flanged coupling 4 with which is connected what may be termed an outlet or low pressure pipe line 5. The interior of the body 3 includes a web 6, which separates the valve body into inlet and outlet chambers 7 and 8 respectively, and the web 6 in this instance is provided with vertically registering ports 9 provided with seats arranged for coaction with the spaced valve heads 10 of a main valve member 11 of the so-called pressure-balanced type.

The valve member is provided with an operating stem 12 and below the lower of the heads 10, the stem terminates in a socketed projection 13, which is adapted to receive a guide pin 14 carried by a bottom closure plate 15 which is removably connected with the flanged lower side of the body 3.

The flanged upper side 16 of the valve body coacts with the similarly flanged lower end of a diaphragm casing 17, which is thus secured to the valve body to constitute an upward extension thereof, and the upper end of the casing 17 terminates in a horizontally disposed enlarged flanged head 18 providing an extended flat surface for the reception of the peripheral portion of a flexible diaphragm 19. The latter is clamped and rigidly secured to the head 18 by the provision of a removable diaphragm cover plate 20. When the diaphragm is mounted in the position disclosed in Fig. 1, there is formed below the same a constant pressure chamber 21 and in the space between the upper portion of the diaphragm 19 and the cover plate 20, a variable pressure chamber 22.

The lower end of the casing section 17 is provided with a web 23 formed with an axial opening for the reception of the valve stem 12, the upper end of said valve stem being connected as at 24 with the central portion of the diaphragm, whereby the flexure of the diaphragm may be employed for controlling the operating positions of the main valve members 11. Between the web 23 and the upper head 10 of the valve member, there surrounds the stem 12 a coil spring 25, which operates to apply force to the valve member so that when pressures on opposite sides of the diaphragm 19 are substantially equal, the said valve member will occupy a position of closure. Additionally, the web 23 is formed with an open ended tube 26 which operates to admit of the flow of gas from the chamber 7 into the constant pressure chamber 21 so that the gas pressures which exist in the chamber 21 substantially correspond with those in the pipe line 1 or the chamber 7.

Figure 4:
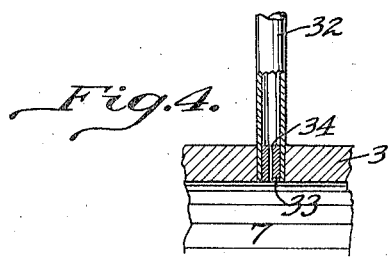
Fig. 4 is a detail sectional view on the line 4—4 of Fig. 1.

To provide for the necessary pressure differentials in the chambers 21 and 22, the cover plate 20 includes an upstanding tube 27, which is joined with a T-connection 28, in which is formed a substantially horizontally extending Venturi passage 29, and the tube 27 terminates in the restricted portion of this passage in a laterally offset end as indicated at 30. The passage 29 constitutes a portion of a by-pass or shunt line 31 extending around the main regulator from the inlet pipe line 1 to the outlet line 5. Thus the inlet side of the passage 29 is connected by means of a pipe 32 with the gas inlet side 7 of the valve body 3, the lower end of the pipe 32, as shown in Fig. 4, being provided with a plug 33 in which is formed a restricted axial orifice 34.

From the outlet side of the Venturi passage 29, a pipe line 35 leads to a chamber 36 formed in connection with the body 37 of a sensitive control regulator 38. This regulator also includes a web 39 provided with a valve port 40, the web 39 serving to separate the chamber 36 of the valve body from a second chamber 41, and from the chamber 41 a pipe connection 42 leads to the outlet or low pressure line 5. A valve 43 carried by a vertical stem 44 controls the flow of gas through the port 40, and to regulate the operation of the valve 43, the upper portion of the body 37 is provided with a diaphragm housing 45. In this housing, there is clamped a freely flexible diaphragm 46 and engaging with the under side of this diaphragm is a head 47 provided on the upper end of the valve stem 44. The stem is guided in its movement by a passage through an opening 48 formed in a web 49 of the valve body 37. The web 49 is additionally ported as at 50 with a restricted orifice to provide for the application of gas pressures to the under side of the diaphragm.

The upper side of the diaphragm 46 engages with a head 51 formed with a stem 52 freely movable through a bearing 53 provided in connection with the upper portion of the housing 45. Engaging with the upper end of the stem 52 is a bearing link 54, which is pivotally mounted as at 55 on an adjustable weight arm 56. This arm is pivotally mounted as at 57 at one end in connection with an ear 58 arising from the top of the housing 45, while the outer free end of the arm includes a pivotally depending weight receiver 59 in connection with which movable weights 60 of predetermined value may be applied.

In the operation of the mechanism, gas travels at high velocity through the by-pass or shunt line 31 and particularly past the nozzle 30 disposed in the Venturi passage 29 when the valve 43 is opened by the forces applied to its diaphragm 46 through the weights 60. The velocity or flow of gases past the nozzle 30 results in producing a suction or vacuum effect in the variable pressure chamber 22 by partially exhausting the gases contained in that chamber. Since the gas pressure in the chamber 21 is constant or in substantial accord with the gas pressures in the line 1, this unbalancing of pressures on opposite sides of the diaphragm 19 causes the latter to flex upwardly, thereby elevating the valve member 11 against the resistance offered by the spring 25 to cause the opening of the ports 9, whereby to effect gas travel from the line 1 to the line 5. Should the pressure in the outlet line 5 exceed a predetermined value, such pressure is transmitted to the chamber 41 of the sensitive control regulator by way of the connection 42, and thence to the lower side of the diaphragm 46 by way of the orifice 50. The weight values at 60 are such that upon the development of this excessive pressure, the diaphragm is flexed upwardly, thereby bringing the valve member 43 to a position of closure or partial closure, and obstructing high velocity gas flow through the by-pass or shunt line. If the valve 43 is completely closed, the gas will travel back through the nozzle 30 into the chamber 22, building up sufficient pressure in this last-named chamber to counter-act the pressures in the chamber 21. When such pressures are substantially balanced, then the spring 25 functions to close the valve member 11 to obstruct further gas flow through the regulator until the pressures which obtain in the outlet or delivery line 5 recede to the desired predetermined value. The sensitivity of this construction is such that even though very high pressures are employed of the order of several hundred pounds in the main pipe line 1, yet but a very slight fluctuation will exist in the desired predetermined pressures in the line 5. By this mechanism, the irregularity in pressures, heretofore considered inevitable in ordinary pressure regulators, is minimized to a very marked degree, and since fluid pressures are used on both sides of the main diaphragm 19, the effective area of this diaphragm in all positions of flexure remain substantially constant so that the valve member 5 operates smoothly in assuming opening and closing positions, overcoming the irregularity or spasmodic action heretofore present in valves of this character. These factors combined, provide for the uniformity of pressure in the low pressure line and also save wear and tear on the regulator diaphragm. Moreover, stuffing boxes or the like are eliminated, so that the friction and repair attention which these devices have required in the past are avoided.

Figures 2, 3:
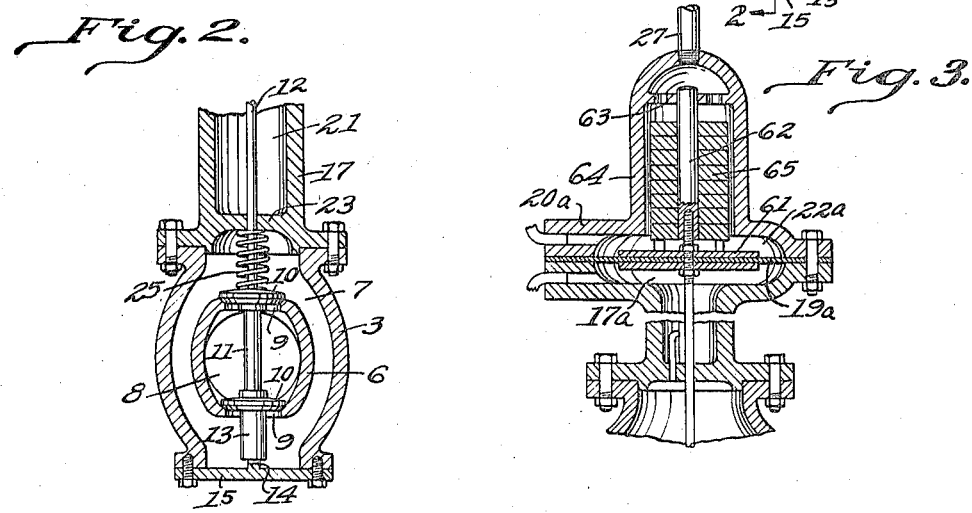
Fig. 2 is a transverse sectional view taken on the plane indicated by the line 2—2 of Fig. 1.
Fig. 3 is a vertical sectional view illustrating a modified form of the invention wherein the valve stem is operated in connection with a variable weight structure in lieu of the spring mechanism disclosed in Fig. 1.

In Fig. 3, a variation of the invention is disclosed, wherein the diaphragm 19a has its upper surface provided with a head 61 and a guide stem 62. The upper end of the stem 62 is confined for travel in a perforated web 63 arranged in a dome shaped enlargement 64 provided in connection with the cover plate 20a of the diaphragm housing. The stem 62 is adapted to receive weights 65 of predetermined value which normally tend to flex the diaphragm 19a downwardly so that the stem 12 will be depressed to maintain its associated valve member in a position of closure when fluid pressures in the chambers 17a and 22a are balanced. The weights 65 may thus be employed in lieu of the spring 25 disclosed in Figs. 1 and 2.

In Fig. 1, the chambers 21 and 22 on the opposite sides of the diaphragm 19, may be connected by a valved pipe line 67 in which a manually controlled valve 68 is arranged. When the regulator is not in operation, the valve member 68 may be opened to provide for uniform pressures in the chambers 21 and 22. Normally, however, in the operation of the regulator, the valve 68 is maintained in a position of closure obstructing gas flow through the line 67. The restricted axial orifice 34 produces a differential pressure across the restriction with resultant drop in pressure in the pipe 32 and the Venturi throat 29 when increased flow conditions exist through the shunt piping.

What is claimed is:

1. Automatic pressure regulating mechanism comprising a primary regulator, a high pressure fluid line entering one side of said regulator and a low pressure line leading from the opposite side of said regulator, a normally closed valve for governing the passage of fluid through said regulator, a diaphragm housing carried in connection with said regulator, a diaphragm arranged in said housing and dividing it into constant and variable pressure chambers, a by-pass line extending around said primary regulator from the inlet to the outlet sides thereof, a secondary regulator arranged in said by-pass line and responsive to the pressure in said low pressure line to control the flow through said by-pass line, a connection between said by-pass line and said variable pressure chamber, and means in said by-pass line between its point of connection to said high pressure line and said secondary regulator responsive to the passage of fluid therethrough to vary the pressure in said variable pressure chamber.

2. Automatic pressure regulating mechanism comprising a primary regulator, a high pressure line entering one side of said regulator, a low pressure line leading from the opposite side of said regulator, a normally closed valve for governing the passage of fluid through said regulator, a diaphragm housing carried in connection with said regulator, a diaphragm arranged in said housing and dividing it into constant and variable pressure chambers, a by-pass line extending around said primary regulator from the inlet to the outlet sides thereof, a secondary regulator arranged in said by-pass line and automatically responsive to pressure drops in said low pressure line to produce fluid flow through said by-pass line, a fitting in said by-pass line between its connection to the high pressure line and said secondary regulator, said fitting having formed therein a Venturi passage, and a connection between said variable pressure chamber and said fitting in the by-pass line at the restricted portion of said Venturi passage so that the passage of fluid through the by-pass line produces an aspirating effect on said variable pressure chamber to withdraw fluid therefrom.

3. Automatic pressure regulating mechanism comprising a primary regulator, a high pressure fluid line entering one side of said regulator and a low pressure line leading from the opposite side of said regulator, a normally closed valve for governing the passage of fluid through said regulator, a diaphragm housing carried in connection with said regulator, a diaphragm arranged in said housing directly connected with said valve and dividing said housing into constant and variable pressure chambers, a by-pass line extending around said primary regulator from the inlet to the outlet sides thereof, a secondary regulator arranged in said by-pass line and automatically responsive to pressure drop in said low pressure line to control fluid flow through said by-pass line, an open fluid transmitting connection joining said by-pass line and said variable pressure chamber at a point in the by-pass line between said secondary regulator and the high pressure line, and suction producing means located in said connection and operated by fluid passage through said by-pass line to lower the pressure in said variable pressure chamber prior to the opening of said normally closed valve.

4. Automatic pressure regulating mechanism comprising a primary regulator, a high pressure fluid line entering one side of said regulator and a low pressure line leading from the opposite side of said regulator, a normally closed valve for governing the passage of fluid through said regulator, a diaphragm housing carried in connection with said regulator, a diaphragm arranged in said housing and dividing it into constant and variable pressure chambers, a by-pass line extending around said primary regulator from the inlet to the outlet sides thereof, a secondary regulator arranged in said by-pass line and responsive to the pressure in said low pressure line to control the passage of fluid through said by-pass line, a fitting arranged in said by-pass line between the secondary regulator and the high pressure line, and an aspirating nozzle located in said fitting and communicating with said variable pressure chamber to lower the pressure therein in response to the passage of fluid through said by-pass line.

MILTON E. LAKE.